E. CHRISTENSEN.
HAND PLANTER.
APPLICATION FILED JAN. 20, 1914.
1,120,598.
Patented Dec. 8, 1914.
2 SHEETS—SHEET 2.
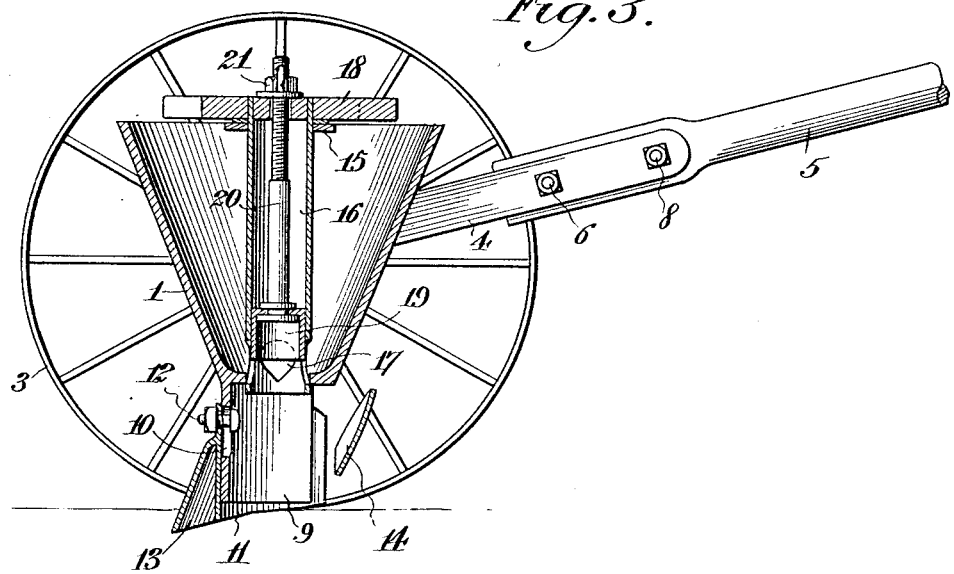
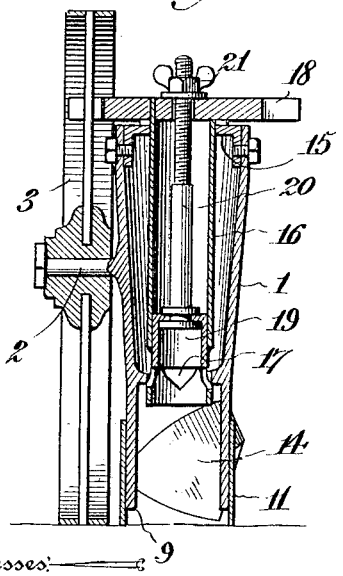
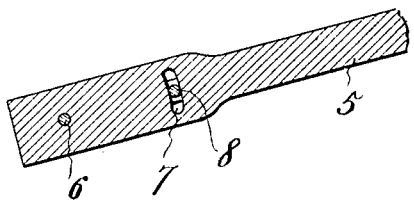
Witnesses:
Christ Feinle, Jr.
K. Peacock
Inventor,
Egner Christensen,
By Victor J. Evans,
Attorney.

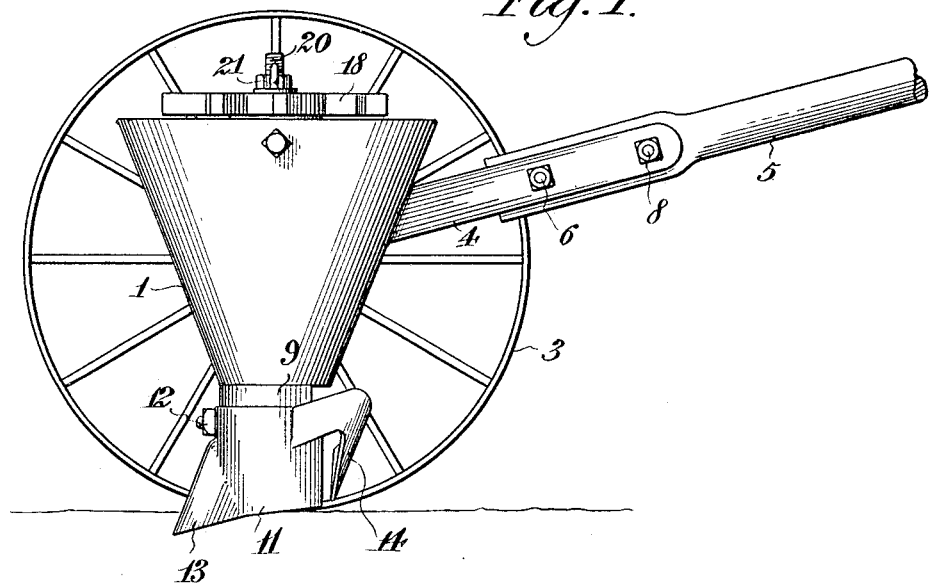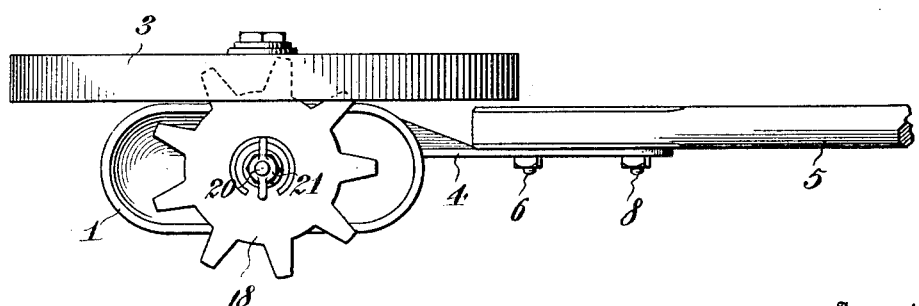

UNITED STATES PATENT OFFICE.

EGNER CHRISTENSEN, OF MONTROSE, IOWA.

HAND-PLANTER.

1,120,598.  Specification of Letters Patent.  Patented Dec. 8, 1914.

Application filed January 20, 1914. Serial No. 813,287.

*To all whom it may concern:*

Be it known that I, EGNER CHRISTENSEN, a citizen of the United States, residing at Montrose, in the county of Lee and State of Iowa, have invented new and useful Improvements in Hand-Planters, of which the following is a specification.

This invention relates to wheel mounted hand planters and it consists in the novel features hereinafter described and claimed.

An object of the invention is to provide a planter of simple and durable structure especially adapted to be used for planting small quantities of seed in gardens or other patches and with the said object in view the planter comprises a hopper mounted upon a supporting wheel. A handle is attached to the hopper and may be used for moving the planter over the soil. A tube is journaled in the hopper and is provided in the vicinity of its lower end with a series of openings through which the seed may pass from the hopper and deposit into soil. Means is provided within the tube for increasing or diminishing the transverse sectional area of the openings therethrough in order that the quantity of seed dropped may be regulated. A furrow opener is adjustably mounted at the lower end of the hopper and is provided with a wing which is adapted to serve as a furrow closer. A star wheel is mounted at the upper end of the tube and above the top of the hopper and its points are adapted to be engaged by the spokes of the supporting wheel whereby the said tube is rotated as the planter is moved over the soil.

In the accompanying drawing:—Figure 1 is a side elevation of the planter. Fig. 2 is a top plan view of the same. Fig. 3 is a longitudinal sectional view of the planter. Fig. 4 is a transverse sectional view of the same. Fig. 5 is a detailed sectional view of a portion of the handle of the planter.

The planter comprises a hopper 1 which is in the general configuration or shape of a funnel but which is flattened so that said hopper is approximately elliptical in transverse section. The hopper is provided at one side with a spindle 2 upon which is journaled a ground or supporting wheel 3. A lug 4 is attached to the hopper 1 and handle 5 is attached to the said lug. A pivot bolt 6 passes through the handle and lug and above the said bolt the handle is provided with a transversely disposed slot 7 and a bolt 8 passes through the said slot and the lug and serves as means for adjustably securing the handle 5 in position upon the lug 4. It is obvious that by loosening the bolt 8 the handle may be swung upon the pivot bolt 6 with relation to the lug 4 and when at a desired angle with relation to the said lug may be secured by tightening the bolt 8.

The hopper is provided at its lower end with an arcuate flange 9 provided with a vertically disposed slot 10. A shoe 11 fits snugly against the forward surface of the flange 9 and is provided with a bolt 12 which passes through the slot 10. The shoe 11 is provided at its front portion with a wedge-shaped section 13 which is adapted to serve as a furrow opener. The shoe 11 is further provided at one side with a curved wing 14 which extends behind the flange 9 and which is adapted to serve as a furrow closer.

A bracket 15 extends transversely across the upper portion of the hopper 1 and a tube 16 is journaled at its upper end in the said bracket and at its lower end in the lower end of the hopper 1. The tube 16 is provided in the vicinity of its lower end with a series of openings 17 and a star wheel 18 is fixed to the upper end of the tube 16 and lies above the upper edge of the hopper 1. The points of the wheel 18 project into the path of movement of the spokes of the supporting wheel 2.

A valve 19 is slidably mounted in the tube 16 and is adapted to move along the openings 17 thereof. A rod 20 is connected at its lower end with a valve 19 and the upper portion of the said rod projects above the upper end of the tube 16. A nut 21 is screw threaded upon the upper end portion of the rod 20 and is adapted to bear at its lower side against the upper end of the tube 16.

From the above description it will be seen that by turning the nut 21 the rod 20 may be moved longitudinally through the tube 16 so that the valve 19 may be moved over the openings 17 to a desired extent to increase or diminish the transverse sectional area of the passage way through the said openings 17. The operator then uses the handle 5 and pushes the planter over the soil and in doing so the section 13 opens a furrow in the soil. As the wheel 3 rotates the spokes thereof encounter the points of the star wheel 18 and the said star wheel is rotated by stages. As the wheel 18 turns the tube 16 is turned correspondingly and this rotating movement on the part of the said tube agitates the seed in the hopper 1 and some of the seed will flow through the opening 17 and deposit in the furrow which has been opened in the soil by the section 13. The wing 14 which follows behind the flange 9 will cast the soil back into the furrow and thus the seed which has been deposited in the furrow is covered with soil. Therefore it will be seen that a simple structure is provided which may be easily and conveniently manipulated for planting small seed in small quantities and the structural arrangement of the planter is such that the planter may be used to advantage in places where space is limited.

Having described the invention what is claimed is:—

1. A planter comprising a hopper, a spindle carried at the side of the hopper, a furrow opener carried at the lower end of the hopper, a wheel journaled upon the spindle, a tube journaled in the hopper and provided with openings, a star wheel fixed to the tube and having its points projecting into the path of movement of the spokes of the supporting wheel and a handle connected with the hopper.

2. A planter comprising a hopper, a spindle carried at the side of the hopper, a supporting wheel journaled upon the spindle, a furrow opener carried at the lower end of the hopper, a furrow closer located at the lower end of the hopper, a tube journaled in the hopper and provided with seed openings, a star wheel fixed to the tube and having its points projecting into the path of the spokes of the supporting wheel and a handle connected with the hopper.

3. A planter comprising a hopper, a wheel journaled to the hopper, a handle attached to the hopper, a shoe adjustably connected with the hopper and having a furrow opener and furrow closer, a tube journaled in the hopper and provided with seed openings, a star wheel fixed to the tube and having its points projecting into the path of movement of the spokes of the supporting wheel.

4. A planter comprising a hopper, a supporting wheel journaled to the hopper, a handle attached to the hopper, a flange provided at the lower end of the hopper, said flange having a vertically disposed slot, a shoe mounted upon the flange, a bolt passing through the slot and the shoe, the shoe having at its forward portion a furrow opener and being provided at its side with a furrow opener which extends behind the said flange, a tube journaled in the hopper and provided with seed openings, and a star wheel fixed to the upper end of the tube and having its points projecting into the path of movement of the spokes of the supporting wheel.

5. A planter comprising a hopper, a wheel journaled to the hopper, a handle connected to the hopper, a furrow opener carried at the lower end of the hopper, a furrow closer carried at the lower end of the hopper, a tube journaled in the hopper and provided in the vicinity of its lower end with seed openings, a star wheel fixed to the tube and having its points projecting into the path of movement of the spokes of the supporting wheel, a valve located in the tube and arranged to move across the openings therein and means for moving the valve.

6. In a planter of the class described a hopper, a wheel journaled to the hopper, a tube journaled in the hopper and provided with openings, a valve slidably arranged in the tube and adapted to move across the opening, a star wheel fixed to the tube and having its points projecting into the path of movement of the spokes of the first mentioned wheel, a rod connected to the valve and a nut screw threaded upon the rod and bearing against the end of the tube.

In testimony whereof I affix my signature in presence of two witnesses.

EGNER CHRISTENSEN.

Witnesses:
  T. D. SPROTT,
  E. H. SINGER.

Copies of this patent may be obtained for five cents each, by addressing the "Commissioner of Patents, Washington, D. C."